United States Patent
Terayama et al.

(10) Patent No.: US 9,620,279 B2
(45) Date of Patent: Apr. 11, 2017

(54) COIL UNIT AND CONTACTLESS POWER SUPPLYING APPARATUS

(71) Applicant: Yazaki Corporation, Tokyo (JP)

(72) Inventors: Hajime Terayama, Susono (JP); Kazuyoshi Kagami, Susono (JP); Shingo Tanaka, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/852,733

(22) Filed: Sep. 14, 2015

(65) Prior Publication Data

US 2016/0005532 A1    Jan. 7, 2016

Related U.S. Application Data

(63) Continuation of application No. PCT/JP2014/056644, filed on Mar. 13, 2014.

(30) Foreign Application Priority Data

Mar. 14, 2013  (JP) .................. 2013-052041

(51) Int. Cl.
*H01F 5/00* (2006.01)
*H01F 27/34* (2006.01)
(Continued)

(52) U.S. Cl.
CPC ............. *H01F 27/346* (2013.01); *H01F 5/00* (2013.01); *H01F 27/00* (2013.01); *H01F 27/02* (2013.01);
(Continued)

(58) Field of Classification Search
CPC ........................ H01F 5/00; H01F 27/00–27/30
(Continued)

(56) References Cited

U.S. PATENT DOCUMENTS

| | | | | |
|---|---|---|---|---|
| 5,945,762 A | * | 8/1999 | Chen ........................ | A61N 1/08 128/899 |
| 7,525,283 B2 | * | 4/2009 | Cheng ....................... | H01F 3/02 320/108 |

(Continued)

FOREIGN PATENT DOCUMENTS

JP     08-055723 A     2/1996
JP     2001-110658 A   4/2001
(Continued)

OTHER PUBLICATIONS

International Search Report mailed Apr. 8, 2014, issued for PCT/JP2014/056644.

*Primary Examiner* — Tuyen Nguyen
(74) *Attorney, Agent, or Firm* — Locke Lord LLP; Howard M. Gitten

(57) ABSTRACT

In a power supplying side core around which a power supplying side resonant coil is wound that contactlessly supplies power to a power receiving side resonant coil, a pair of protrusion portions is provided that protrudes from central axis direction both sides of the power supplying side resonant coil toward the power receiving side resonant coil. Further, in a power receiving side core around which the power receiving side resonant coil is wound that contactlessly receives power from the power supplying side resonant coil, a pair of protrusion portions is provided that protrudes from central axis direction both sides of the power receiving side resonant coil toward the power supplying side resonant coil.

2 Claims, 5 Drawing Sheets

(51) Int. Cl.
*H01F 27/06* (2006.01)
*H01F 27/02* (2006.01)
*H01F 27/00* (2006.01)
*H01F 27/08* (2006.01)
*H01F 38/14* (2006.01)
*H01F 27/24* (2006.01)

(52) U.S. Cl.
CPC .............. *H01F 27/06* (2013.01); *H01F 27/08* (2013.01); *H01F 27/24* (2013.01); *H01F 38/14* (2013.01)

(58) Field of Classification Search
USPC .......................................... 336/65, 200, 232
See application file for complete search history.

(56) References Cited

U.S. PATENT DOCUMENTS

| | | | | |
|---|---|---|---|---|
| 7,825,544 B2 * | 11/2010 | Jansen | ................. | A61C 1/0015 |
| | | | | 307/104 |
| 2005/0018452 A1 * | 1/2005 | Seo | ......................... | H01F 38/14 |
| | | | | 363/16 |

FOREIGN PATENT DOCUMENTS

| | | | |
|---|---|---|---|
| JP | 2009-158501 A | 7/2009 |
| JP | 2011-049230 A | 3/2011 |
| JP | 2012-099644 A | 5/2012 |
| JP | 2012-151311 A | 8/2012 |
| JP | 2012-231603 A | 11/2012 |
| JP | 2014-011332 A | 1/2014 |

* cited by examiner

CONVENTIONAL PRODUCT

PRESENT INVENTION PRODUCT

COIL UNIT AND CONTACTLESS POWER SUPPLYING APPARATUS

TECHNICAL FIELD

The present invention relates to a coil unit and a contactless power supplying apparatus, especially, a coil unit that performs contactless power supplying and a contactless power supplying apparatus that includes the coil unit.

BACKGROUND OF THE INVENTION

In recent years, as a power supplying system for supplying power to a battery mounted on a hybrid vehicle and an electric vehicle, wireless power supplying has been focused that does not use a power supply cord and a power transmission cable (Patent Literatures 1 to 3). As one of the wireless power supplying technique, that of a resonant type has been known. In the resonant type contactless power supplying apparatus, one of a pair of resonant coils electromagnetically resonant with each other is installed on the ground of a power supplying facility and the other is mounted on a vehicle, and power is contactlessly supplied from the resonant coil installed on the ground of the power supplying facility to the resonant coil mounted on the vehicle. Hereinafter, one of the resonant coil that is installed on the power supplying facility is referred to as a power supplying side resonant coil, and the other of the resonant coil that is mounted on the vehicle is referred to as a power receiving side resonant coil.

In the contactless power supplying apparatus described above, the power receiving side resonant coil is mounted on the vehicle. Therefore, there have been problems that, when the vehicle is not accurately stopped at a predetermined power supplying position, position displacement occurs between the power supplying side resonant coil and the power receiving side resonant coil, and then a leakage magnetic field is generated and a decrease in power efficiency occurs.

To solve the problems, in Patent Literature 1, it has been described that the power receiving side resonant coil and the power supplying side resonant coil are attached to the vehicle and the ground via a shield plate that shields leakage magnetic flux. The leakage magnetic flux is shielded by the shield plate, and also a decrease in power efficiency can be reduced. However, in conventional techniques, it could not have been said that an increase in the leakage magnetic flux to the position displacement and the decrease in power efficiency can be sufficiently reduced.

CITATION LIST

Patent Literatures

Patent Literature 1: JP2011-49230 A
Patent Literature 2: JP2012-231603 A
Patent Literature 3: JP2012-151311 A

SUMMARY OF THE INVENTION

Technical Problem

Therefore, the present invention aims to provide a coil unit and a contactless power supplying apparatus capable of reducing an increase in leakage magnetic flux to position displacement and a decrease in power efficiency.

Solution to Problem

The first aspect of the present invention for solving the problem described above is a coil unit including a coil that performs contactless power supplying with another coil, and a core to which the coil is wound, a central axis of the coil being disposed to be vertical to a separation direction of the other coil and the coil at a time of the power supplying, in which the core is provided with a pair of protrusion portions that protrudes from central axis direction both sides of the coil toward the other coil, and the core is provided to be divided into a center portion around which the coil is wound, and both end portions respectively provided with the pair of protrusion portions, and the core is divided such that the both end portions are overlapped with respective end surfaces of the axial direction both sides of the coil of the central portion, and protrusion amounts of the pair of protrusion portions are adjusted depending on an inclination of the other coil.

The second aspect of the present invention is a contactless power supplying apparatus including a pair of coil units that performs contactless power supplying, in which at least one of the pair of coil units includes the coil unit according to the first aspect.

Advantageous Effects of Invention

As described above, according to the first and second aspects of the present invention, since a core is provided with a pair of protrusion portions that protrudes from central axis direction both sides of a coil toward another coil, an increase in leakage magnetic flux to position displacement and a decrease in power efficiency can be reduced. Further, since the core is provided to be divided into a center portion to which the coil is wound and both end portions respectively provided with the pair of protrusion portions, the core can be easily manufactured. Further, even when the other coil or the coil is attached to be inclined, by moving the both end portions depending on the inclination to adjust protrusion amounts of the protrusion portions, a magnetic field distribution can be adjusted to be close to that in a state in which the coil is not inclined.

DESCRIPTION OF THE PREFERRED EMBODIMENTS

Figure 1:
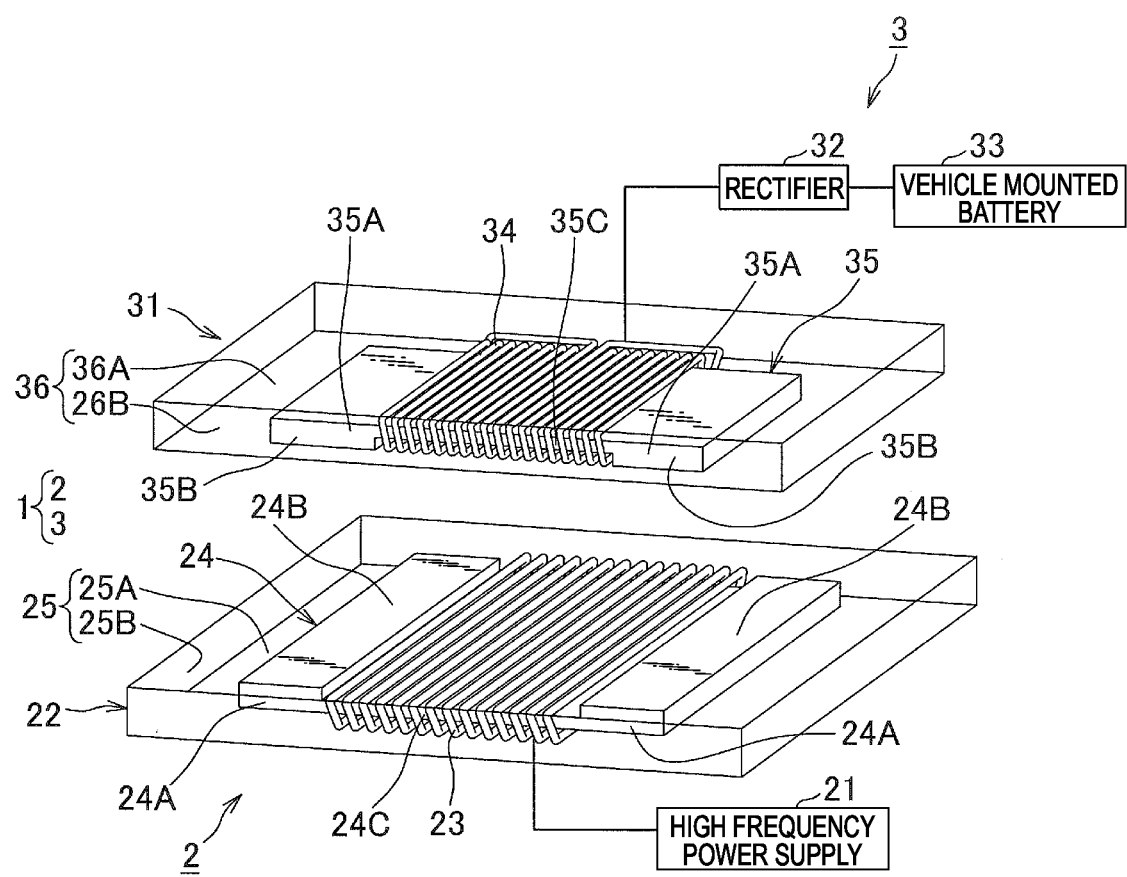
FIG. 1 is a schematic perspective view illustrating one embodiment of a contactless power supplying apparatus of the present invention.
Figure 2:
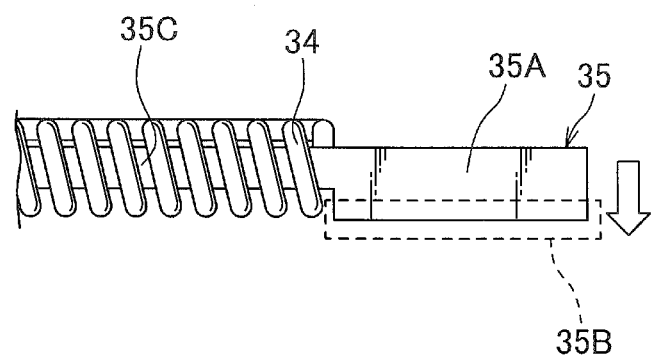
FIG. 2 is a partial side view of the contactless power supplying apparatus illustrated in FIG. 1.
Figure 2:
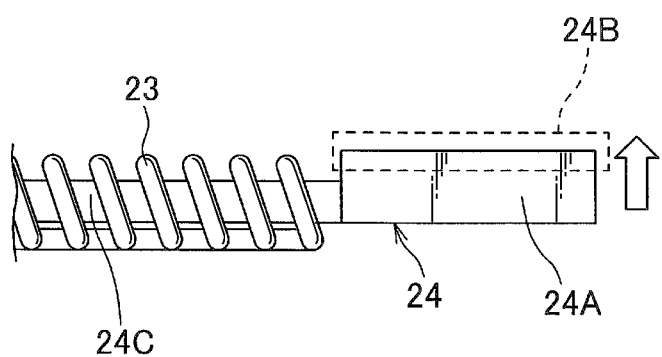

Hereinafter, a power supplying system of the present invention will be described with reference to FIG. 1 to FIG. 3. As illustrated in FIG. 1, a contactless power supplying apparatus 1 includes a power supplying unit 2 provided in a power supplying facility, and a power receiving unit 3 mounted on a vehicle.

The power supplying unit 2, as illustrated in FIG. 1, includes a high frequency power supply 21 as a power supply, and a power supplying side coil unit 22 (coil unit) to which high frequency power from the high frequency power supply 21 is supplied.

The high frequency power supply 21 generates the high frequency power to supply the power to a power supplying side resonant coil 23 to be described later of the power supplying side coil unit 22. The high frequency power to be generated by the high frequency power supply 21 is provided so that the frequency is equal to a resonant frequency (for example, 13.56 MHz) of the power supplying side resonant coil 23 and the power receiving side resonant coil 34 to be described later.

The power supplying side coil unit 22 includes a power supplying side resonant coil 23 (coil), a power supplying side core 24 (core) to which the power supplying side resonant coil 23 is wound, a power supplying side capacitor (not illustrated) connected across both ends of the power supplying side resonant coil 23, and a power supplying side shield case 25 for housing the power supplying side resonant coil 23 and the power supplying side core 24.

The power supplying side resonant coil 23 is configured by winding a conductive wire in a solenoidal shape around the power supplying side core 24. That is, the power supplying side resonant coil 23 is provided so that its central axis is vertical to a separation direction (vertical direction) of the power supplying side resonant coil 23 and the power receiving side resonant coil 34 at the time of supplying power, namely, along a parallel direction. Across the both ends of the power supplying side resonant coil 23, a power supplying side capacitor (not illustrated) for adjusting a resonant frequency is connected.

The power supplying side core 24 is configured from a magnetic body such as ferrite, and provided in a substantially flat plate-like shape. The power supplying side core 24 is disposed horizontally. The power supplying side core 24, as illustrated in FIG. 1 and FIG. 2, is provided with a pair of protrusion portions 24B that protrudes from both end portions 24A in the central axis direction of the power supplying side resonant coil 23 toward a power receiving side coil unit 31 to be described later.

Figure 3:
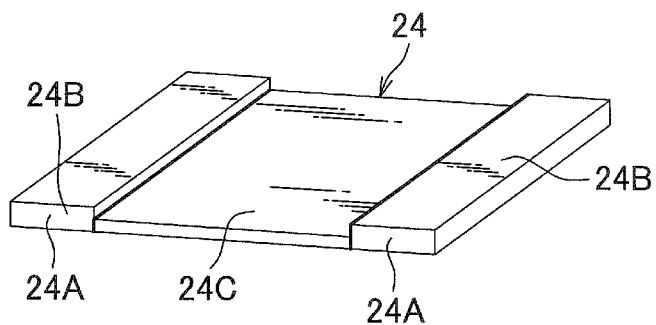
FIG. 3 is a perspective view of a core that configures the contactless power supplying apparatus illustrated in FIG. 1.

Further, the power supplying side core 24, as illustrated in FIG. 3, is provided to be divided into three portions of a center portion 24C around which the power supplying side resonant coil 23 is wound, and a pair of both end portions 24A respectively provided with a pair of protrusion portions 24B. As a result, the center portion 24C is configured of a flat plate with a uniform thickness. Further, the pair of both end portions 24A is configured of a flat plate with a uniform thickness greater than that of the center portion 24C.

The power supplying side capacitor (not illustrated) is a capacitor for adjusting the resonant frequency connected to the power supplying side resonant coil 23 in parallel or in series, and works as a resonant circuit with the power supplying side resonant coil 23.

The power supplying side shield case 25 is configured from a highly conductive metal shield such as copper and aluminum. The power supplying side shield case 25 is configured of a bottom wall 25A that covers a side away from the power receiving side coil unit 31 to be described later of the power supplying side core 24 to which the power supplying side resonant coil 23 is wound, and a standing wall 25B that stands from a peripheral edge of the bottom wall 25A, and is provided in a box shape in which the power receiving side coil unit 31 side is opened. The bottom wall 25A is provided in a slightly larger rectangular shape than the power supplying side core 24. The standing wall 25B is provided to surround the side surface of the power supplying side core 24.

The power receiving unit 3, as illustrated in FIG. 1, includes the power receiving side coil unit 31 (coil unit), a rectifier 32 that converts the high frequency power received by the power receiving side coil unit 31 to DC power, and a vehicle mounted battery 33 to which the DC power converted by the rectifier 32 is supplied.

The power receiving side coil unit 31 includes the power receiving side resonant coil 34 (coil) that electromagnetically resonates with the power supplying side resonant coil 23, a power receiving side core 35 (core) to which the power receiving side resonant coil 34 is wound, a power receiving side capacitor (not illustrated) connected across both ends of the power receiving side resonant coil 34, and a power receiving side shield case 36 for housing the power receiving side resonant coil 34 and the power receiving side core 35.

The power receiving side resonant coil 34 is provided in a smaller diameter than that of the power supplying side resonant coil 23 described above, and is provided so that its central axis is vertical to the separation direction (vertical direction) of the power supplying side resonant coil 23 and the power receiving side resonant coil 34, namely, along the parallel direction. Across the both ends power receiving side resonant coil 34, the power receiving side capacitor (not illustrated) for adjusting the resonant frequency is connected.

The power receiving side core 35 is configured from a magnetic body such as ferrite, and is provided in a substantially flat plate-like shape and in a smaller width than that of the power supplying side core 24. The power receiving side core 35 is disposed horizontally. The power receiving side core 35, as illustrated in FIG. 2, is provided with a pair of protrusion portions 35B that protrudes from both end portions 35A in the central axis direction of the power receiving side resonant coil 34 toward the power supplying side coil unit 22.

Further, although the power receiving side core 35, similar to the power supplying side core 24, may also be divided into three portions of a center portion 35C around which the power receiving side resonant coil 34 is wound, and the both end portions 35A respectively provided with the pair of protrusion portions 35B, in the present embodiment, an example will be described in which the core is not divided.

The power receiving side shield case 36 is configured from a highly conductive metal shield such as copper and aluminum. The power receiving side shield case 36 is configured of a bottom wall 36A that covers a side away from the power supplying side resonant coil 23 to be described later of the power receiving side resonant coil 34, and a standing wall 36B that stands from a peripheral edge of the bottom wall 36A, and is provided in a box shape in which the power supplying side coil unit 22 side is opened. The bottom wall 36A is provided in a slightly larger rectangular shape than the power receiving side core 35. The standing wall 36B is provided to surround the side surface of the power receiving side core 35.

According to the contactless power supplying apparatus 1 described above, when the power receiving side coil unit 31 of the vehicle approaches the power supplying side coil unit 22 provided on the ground of the power supplying facility and then the power supplying side resonant coil 23 and the power receiving side resonant coil 34 electromagnetically resonate with each other, power is contactlessly supplied from the power supplying unit 2 to the power receiving unit 3, and the vehicle mounted battery 33 is charged.

According to the embodiment described above, since the power supplying side core 24 is provided with the pair of protrusion portions 24B that protrudes from central axis direction both sides of the power supplying side resonant coil 23 toward the power receiving side resonant coil 34, an increase in leakage magnetic flux to position displacement and a decrease in power efficiency can be reduced.

Figure 4:
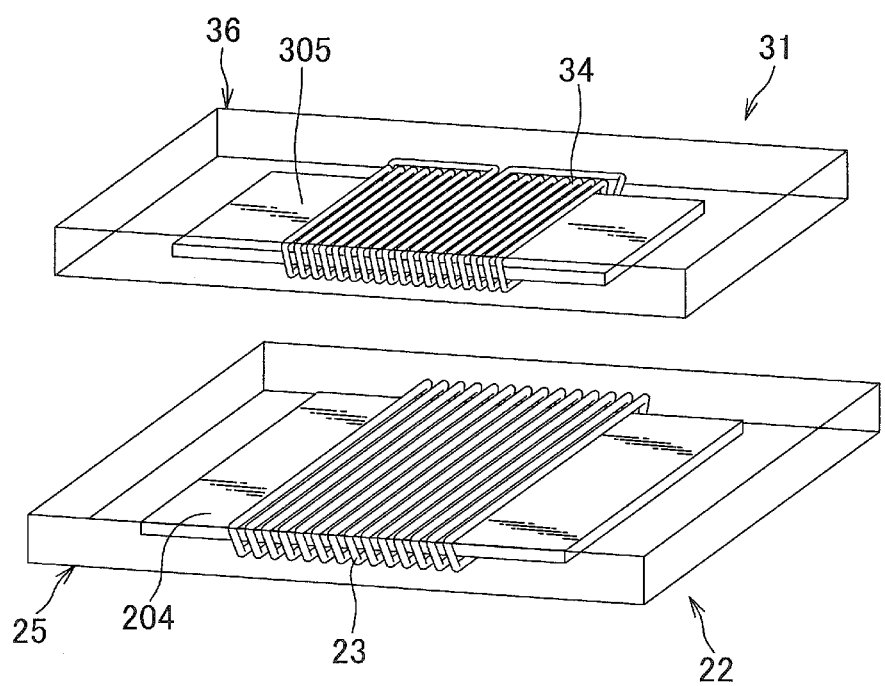
FIG. 4 is a schematic perspective view illustrating one example of a conventional product.

Next, the present inventors, in order to confirm the effect, have performed a simulation of lines of magnetic force generated in the present invention product illustrated in FIG. 1 and the conventional product illustrated in FIG. 4. The result is illustrated in FIG. 5. In the conventional product illustrated in FIG. 4, the power supplying side core 204 and the power receiving side core 305 to which the power supplying side resonant coil 23 and the power receiving side resonant coil 34 are wound respectively are provided in a flat plate-like shape in which the protrusion portions are not provided. Since the other portions are the same as the present invention product illustrated in FIG. 1, they are denoted by the same reference numerals and description thereof is omitted.

Figure 5B:
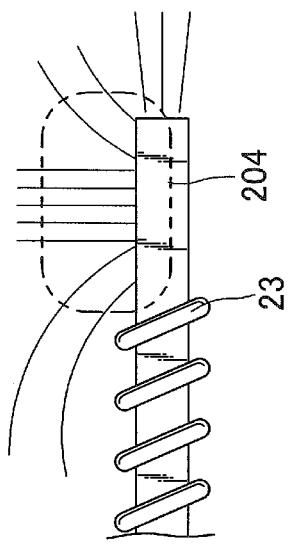
FIGS. 5A and 5B respectively illustrate simulation results of lines of magnetic force generated in the present invention product illustrated in FIG. 1 and the conventional product illustrated in FIG. 4.
Figure 5A:
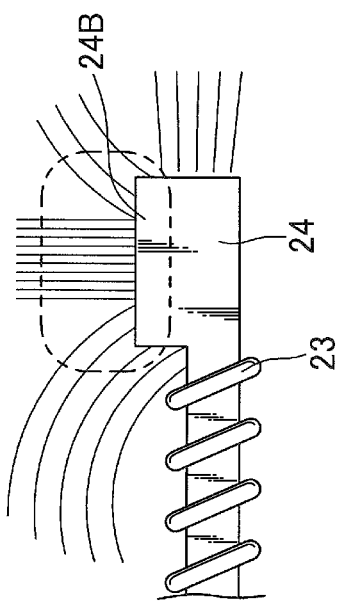

As it is apparent from a comparison of portions surrounded by dotted lines in FIGS. 5(A) and 5(B), since the magnetic field is collected by the protrusion portions 24B, the present invention product can make larger density of the lines of magnetic force toward the power receiving side coil unit 31 than the conventional product. Therefore, it has been found that reduction of the leakage magnetic flux and improvement of the power efficiency can be achieved. Incidentally, as the widths of the protrusion portions 24B, 35B become wider, the reduction of the leakage magnetic flux and the improvement of the power efficiency can be achieved.

Figure 6:
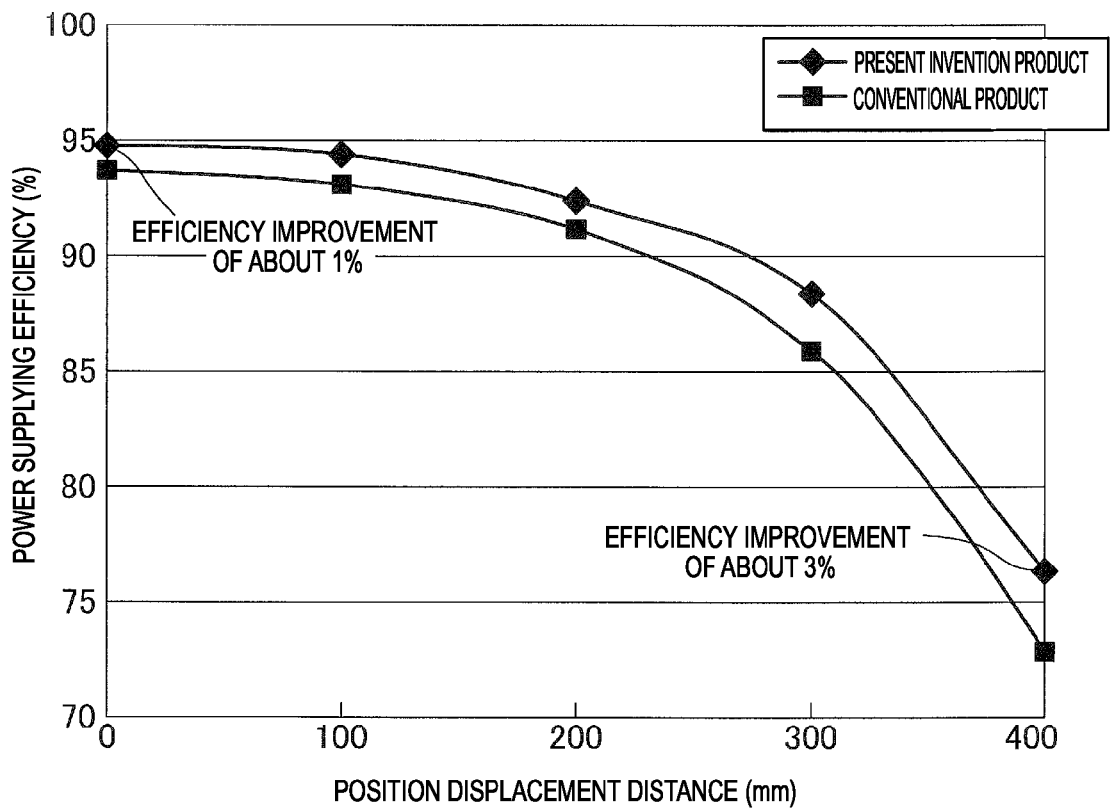
FIG. 6 is a graph illustrating simulation results of power supplying efficiency to a position displacement distance of a power receiving side coil unit for the present invention product illustrated in FIG. 1 and the conventional product illustrated in FIG. 4.

Further, the present inventors, in order to confirm the effect, have performed a simulation of power supplying efficiency depending on a position displacement distance of the power receiving side coil unit 31 for the present invention product illustrated in FIG. 1 and the conventional product illustrated in FIG. 4. The result is illustrated in FIG. 6. Incidentally, a position displacement distance is 0 in a state that the centers of the power supplying side resonant coil 23 and the power receiving side resonant coil 34 faces each other in the vertical direction, and a position displacement distance is an amount of displacement in a width direction when the power receiving side resonant coil 34 is moved in the width direction of the power receiving side cores 35, 305.

As illustrated in FIG. 6, it has been found that, even when the position displacement distance is 0, the power supplying efficiency is improved by about 1% in the present invention product in comparison with the conventional product. Further, it has been found that, when the position displacement distance is 400 mm, the power supplying efficiency is improved by about 3% in the present invention product in comparison with the conventional product.

Further, according to the contactless power supplying apparatus 1 described above, since the power supplying side core 24 is provided to be divided into the center portion 24C around which the power supplying side resonant coil 23 is wound and the both end portions 24A respectively provided with the pair of protrusion portions 24B, the power supplying side core 24 can be easily manufactured. Further, as illustrated in FIG. 7, even when the power receiving side resonant coil 34 is attached to be inclined, by moving the both end portions 24A depending on the inclination to adjust protrusion amounts of the protrusion portions 24B, the magnetic field distribution can be adjusted to be close to that in a state in which the coil is not inclined.

Figure 7:
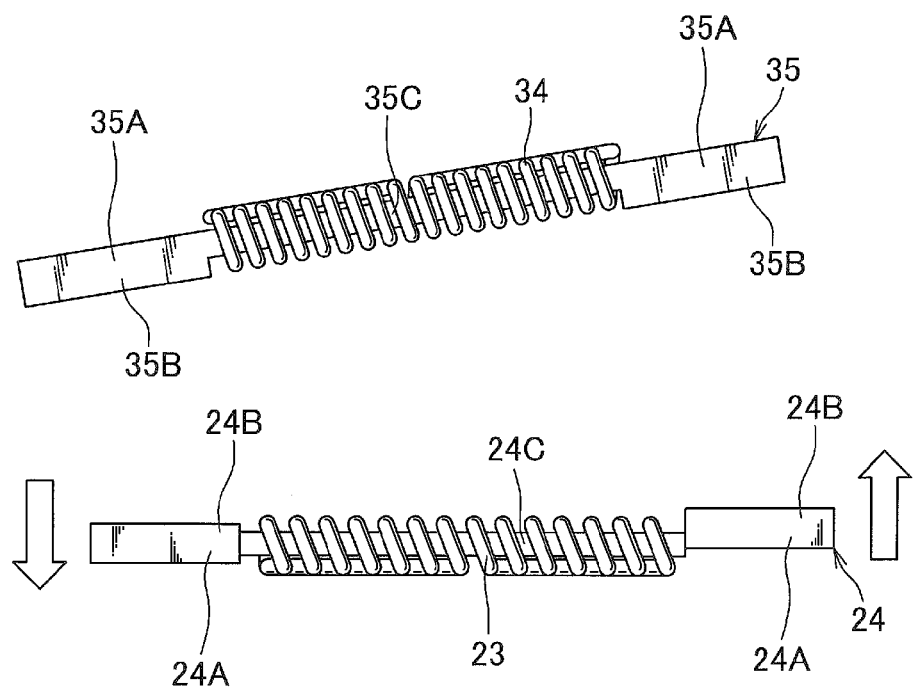
FIG. 7 is a diagram for describing protrusion amounts of protrusion portions of a power supplying side core to an inclination of the power receiving side coil unit.

In detail, as illustrated in FIG. 7, a case is considered when the power receiving side resonant coil 34 is attached to the vehicle so that the left in the figure of the power receiving side resonant coil 34 is inclined to approach the power supplying side coil unit 22. In this case, magnetic field coupling between the power receiving side resonant coil 34 and the power supplying side resonant coil 23 is greater in the left in the figure than in the right in the figure. Therefore, in the power supplying side core 24, when a protrusion amount of the protrusion portion 24B in the right in the figure is made to be greater than a protrusion amount of the protrusion portion 24B in the left in the figure, the magnetic field couplings with the power supplying side resonant coil 23 of the left and right of the power receiving side resonant coil 34 become the same level, and the magnetic field distribution can be adjusted to be close to that in a state in which the coil is not inclined.

Incidentally, according to the embodiment described above, although both the power supplying side core 24 and the power receiving side core 35 have been respectively provided with the protrusion portions 24B, 35B, the present invention is not limited thereto, and the protrusion portions may be provided to only one of the power supplying side core 24 and the power receiving side core 35.

Further, in the embodiment described above, although the power supplying side core 24 has been divided into the center portion 24C and the pair of both end portions 24A to adjust the protrusion amounts of the protrusion portions 24B depending on the inclination of the power receiving side resonant coil 34, the present invention is not limited thereto. When an angle to be inclined is known in advance, such as when the power receiving side resonant coil 34 has to be attached to be inclined due to structure of the vehicle, the power receiving side core 35 may be divided into three portions of the both end portions 35A and the center portion 35C to adjust protrusion amounts of the protrusion portions 35B depending on the inclination.

Further, in the embodiment described above, although power has been directly supplied from the high frequency power supply 21 to the power supplying side resonant coil 23, the present invention is not limited thereto. For example, the power may be supplied from the high frequency power supply 21 to the loop antenna, and supplied from the loop antenna to the power supplying side resonant coil 23 by electromagnetic induction.

Further, in the embodiment described above, the power has been directly supplied from the power receiving side resonant coil 34 to the vehicle mounted battery 33. However the present invention is not limited thereto. For example, the power may be supplied from the power receiving side resonant coil 34 to the vehicle mounted battery 33 via the loop antenna that receives the power supplying by electromagnetic induction.

Further, in the embodiment described above, although the power receiving side resonant coil 34 has been provided in smaller diameter than that of the power supplying side resonant coil 23 by providing the power receiving side core 35 in narrower width than that of the power supplying side core 24, the present invention is not limited thereto. The power supplying side resonant coil 23 and the power receiving side resonant coil 34 may be provided in the same diameter.

Further, the embodiments described above have shown merely exemplary form of the present invention, and the present invention is not limited to the embodiments. That is, it can be implemented in various modifications without departing from the gist of the present invention.

REFERENCE SIGNS LIST

1 contactless power supplying apparatus
22 power supplying side coil unit (coil unit)
23 power supplying side resonant coil (coil)
24 power supplying side core (core)
24A both end portions
24B protrusion portion
24C center portion
31 power receiving side coil unit (coil unit)
34 power receiving side resonant coil (coil)
35 power receiving side core (core)
35A both end portions
35B protrusion portion
35C center portion

What is claimed is:

1. A coil unit comprising a coil that performs contactless power supplying with another coil, and a core around which the coil is wound, a central axis of the coil being disposed to be vertical to a separation direction of the other coil and the coil at a time of the power supplying,
    wherein the core is divided into a center portion around which the coil is wound and opposed end portions, the opposed end portions of the core being respectively provided with a pair of protrusion portions that protrude toward the another coil,
    wherein the center portion and the opposed end portions are arranged side by side along the central axis of the coil, and
        wherein a protrusion amount of one of the pair of protrusion portions is adjustable to be larger than a protrusion amount of the other of the pair of protrusion portions by moving the opposed end portions relative to the center portion.

2. A contactless power supplying apparatus comprising a pair of coil units that performs contactless power supplying, wherein at least one of the pair of coil units includes the coil unit described in claim 1.

* * * * *